United States Patent
Rajsic

(10) Patent No.: US 7,978,707 B2
(45) Date of Patent: Jul. 12, 2011

(54) METHOD AND APPARATUS FOR SECURELY ESTABLISHING L3-SVC CONNECTIONS

(75) Inventor: Carl Rajsic, Nepean (CA)

(73) Assignee: Alcatel Lucent, Paris (FR)

( * ) Notice: Subject to any disclaimer, the term of this patent is extended or adjusted under 35 U.S.C. 154(b) by 2310 days.

(21) Appl. No.: 10/814,330

(22) Filed: Apr. 1, 2004

(65) Prior Publication Data

US 2005/0220119 A1 Oct. 6, 2005

(51) Int. Cl.
*H04L 12/28* (2006.01)
(52) U.S. Cl. .......... 370/395.21; 370/395.1; 370/397
(58) Field of Classification Search ............ None
See application file for complete search history.

(56) References Cited

U.S. PATENT DOCUMENTS

| | | | |
|---|---|---|---|
| 6,757,278 B1 * | 6/2004 | Bi et al. .......... | 370/356 |
| 7,130,393 B2 * | 10/2006 | Hall et al. .......... | 379/90.01 |
| 7,187,678 B2 * | 3/2007 | Cunetto et al. .......... | 370/395.2 |
| 2002/0003776 A1 | 1/2002 | Gokhale et al. | |
| 2002/0064159 A1 * | 5/2002 | Shirakawa .......... | 370/395.1 |

FOREIGN PATENT DOCUMENTS

| WO | WO 02/37779 | 5/2002 |
|---|---|---|
| WO | WO 02/076027 | 9/2002 |

OTHER PUBLICATIONS

International Telecommunications Union, Series Q: Switching and Signalling Broadband ISDN-B-ISDN Application Protocols for Access Signalling, ITU-T Q.2955.1, Jun. 1997.

* cited by examiner

*Primary Examiner* — Michael J Moore, Jr.
(74) *Attorney, Agent, or Firm* — Kramer & Amado PC.

(57) ABSTRACT

A system and method are provided for securely establishing Layer-3 SVCs or SPVCs across an ATM network. An originating multiservice switch that generates the connection setup message for the Layer-3 connection includes security information within the setup message, such as a Closed User Group Interlock Code. When the destination multiservice switch receives the setup message, it extracts the embedded security information and compares it with stored security information corresponding to the connection. The correspondence may be determined from the destination user. If the embedded security information matches the stored security information, the destination multiservice switch allows the connection to be established.

1 Claim, 5 Drawing Sheets

METHOD AND APPARATUS FOR SECURELY ESTABLISHING L3-SVC CONNECTIONS

FIELD OF THE INVENTION

The invention relates to ATM communication systems, and more particularly to secure establishment of Layer-3 connections in such systems.

BACKGROUND OF THE INVENTION

Internet Protocol (IP) traffic can be carried over an Asynchronous Transfer Mode (ATM) network using Switched Virtual Circuits (SVCs) or Soft Permanent Virtual Circuits (SPVCs). Conventionally, ATM switches are used to provide Customer Premises Equipment devices (CPEs) with access to the ATM network. If a CPE wishes to use multiple IP services, such as by using a Digital Subscriber Line (DSL), then use of ATM switches and conventional ATM signaling requires a separate SVC or SPVC to be used for each such IP service. Each SVC or SPVC uses resources within the ATM network, and also uses resources (such as output ports) of a CPE modem used by the CPE to access the ATM network (usually through a DSL access modem).

U.S. patent application Ser. No. 10/417,116, entitled "SVC/SPVC with L3 IP Forwarding", filed on Apr. 17, 2003 and incorporated by reference herein, teaches a method of carrying IP traffic over an ATM network in which only a single SVC or SPVC is used to carry IP traffic from multiple sources, such as from multiple users beyond a DSL access modem (DSLAM). Multiservice switches are used to provide the CPEs with access to the ATM network. By modifying the ATM signaling, IP forwarding within the multiservice switches can be used. Traffic from multiple services, either from a single CPE or from multiple CPEs sharing a DSLAM, accesses the ATM network through a single IP interface at the multiservice switch. The multiservice switch forwards the IP packets across its switch fabric to an egress port of the multiservice switch. The egress port is one endpoint of a single SPVC or SVC used to carry all traffic from the multiple services. The other endpoint of the SPVC or SVC is an ingress port of the destination multiservice switch. The destination multiservice switch extracts the IP packets arriving over the SPVC or SVC, and forwards them using IP forwarding to one or more IP interfaces at the destination multiservice switch, each of which leads to a service.

While the method and system taught by U.S. patent application Ser. No. 10/417,116 allows efficient use of resources when transporting IP traffic over an ATM network, the system is inherently insecure. In conventional ATM networks, Closed User Groups (CUGs) can be used to provide security, as described in ITU-T, "Stage 3 Description for Community of Interest Supplementary Services using B-ISDN Digital Subscriber Signaling System No. 2 (DSS2)", Section 1, Draft ITU-T Recommendation Q.2955.1. However, conventional use of CUGs with Layer-3 SVCs or Layer-3 SPVCs is not currently supported, partly because a user location to associate with a CUG is not easily identifiable during creation of Layer-3 SVCs and Layer-3 SPVCs. Similarly, Layer-3 forwarding SVCs and SPVCs do not support other conventional security features.

SUMMARY OF THE INVENTION

In accordance with one aspect of the invention, a method is provided for establishing a secure Layer-3 connection across an ATM network, the Layer-3 connection having a first endpoint at an egress port of an originating multiservice switch (MSS) and a second endpoint at an ingress port of a terminating MSS. The terminating MSS is configured with anticipated security information. At the originating MSS, a setup message is generated, and includes embedded security information. The setup message is sent to the terminating MSS. At the terminating MSS, the embedded security information is extracted from the setup message. It is determined whether the embedded security information matches the anticipated security information. If the embedded security information matches the anticipated security information, the Layer-3 connection is established.

Multiservice switches and computer-readable media are provided for executing the above methods.

The methods and apparatus of the present invention allow establishment of Layer-3 SVCs and SPVCs in a secure manner. By including security information in Layer-3 SVC or SPVC setup messages, the call controller at a terminating multiservice switch can compare the security information provided by the originating multiservice switch with stored security information to determine whether the connection should be established.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
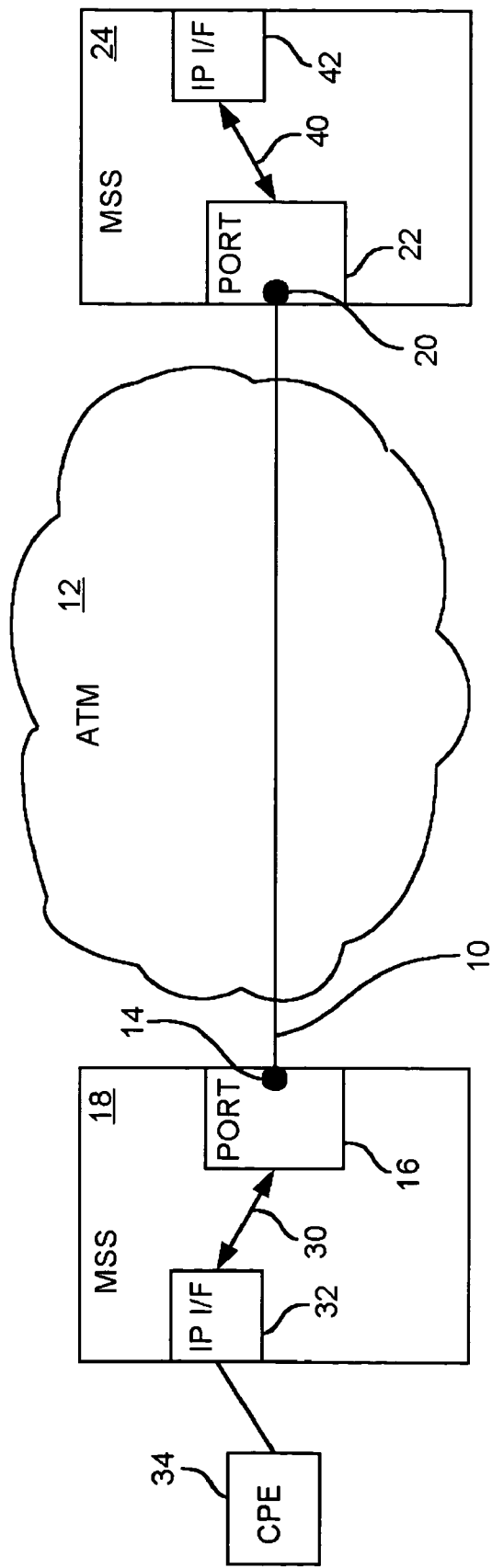
FIG. 1 is a block diagram of an example of a Layer-3 Soft Permanent Virtual Circuit within a communication network.

Referring to FIG. 1, a block diagram of an example Layer-3 Soft Permanent Virtual Circuit (SPVC) within a communication network according to one embodiment of the invention is shown. The SPVC 10 is carried over an Asynchronous Transfer Mode (ATM) network 12. The SPVC 10 has a first endpoint 14 at an egress port 16 of a Layer-3 SPVC originating multiservice switch (MSS) 18. The SPVC 10 has a second endpoint 20 at an ingress port 22 of a Layer-3 SPVC terminating MSS 24. Each MSS 18 and 24 is capable of providing at least ATM service and Internet Protocol (IP) service. Each endpoint 14 and 20 has an assigned or signaled IP address or addresses, and uses Layer-3 IP forwarding to route IP packets between the endpoint and IP interfaces across the respective MSS. Within the originating MSS 18, IP packets are forwarded across a multiservice switch fabric 30 between the first endpoint 14 and an originating IP interface 32. A first Customer Premises Equipment (CPE) 34 communicates with the SPVC 10 through the originating IP interface 32.

In FIG. 1, the first CPE 34 is an abstraction, and may include more than one device. There may also be additional CPEs (not shown) coupled to the originating MSS 18 through respective IP interfaces, each such additional CPE communicating IP packets to the terminating MSS 24 over the Layer-3 SPVC 10.

Similarly, within the terminating MSS 24, IP packets are forwarded across a multiservice switch fabric 40 between the second endpoint 20 and at least one terminating IP interface 42. An example of when there would be more than one terminating IP interface 42 is if the first CPE 34 is accessing multiple IP services through the terminating MSS 24, or if multiple CPEs at the originating MSS 18 are accessing multiple IP services through the terminating MSS 24 independently.

FIG. 1 has been described with reference to an SPVC. Alternatively, the ATM network 10 could carry a Layer-3 Switched Virtual Circuit (SVC), which would also have endpoints 14 and 20 at the network-side ports 16 and 22. As in the case of a Layer-3 SPVC, each endpoint 14 and 20 has an assigned or signaled IP address or addresses, and uses Layer-3 IP forwarding to route IP packets between the endpoint and IP interfaces across the MSS.

The originating MSS 18 includes call setup functionality, known as call control (not shown in FIG. 1). The call control includes instructions for generating and sending setup messages. In the preferred embodiment, the instructions are in the form of software within a processor, but may more generally be in the form of any combination of software or hardware, including hardware within an integrated circuit. The processor need not be a single device, but rather the instructions could be located in more than one device. If in the form of software, the instructions may be stored on a computer-readable medium. When an SPVC is to be established, the call control sends a setup message to the terminating MSS 24. The setup message includes security information, such as a Closed User Group (CUG) Interlock Code (IC). When an SVC is to be established, the call control includes security information, such as a CUG IC, and also includes an IP interface subscriber identifier (ID) in the setup message.

The terminating MSS 24 includes a call controller and a comparator (neither of which is shown in FIG. 1). The call controller includes instructions for verifying security information included in the setup messages sent by the originating MSS 18. In the preferred embodiment, the instructions are in the form of software within a processor, but may more generally be in the form of any combination of software or hardware, including hardware within an integrated circuit. The processor need not be a single device, but rather the instructions could be located in more than one device. If in the form of software, the instructions may be stored on a computer-readable medium. The comparator includes instructions for comparing two sets of security information.

Broadly, the terminating MSS 24 is configured with anticipated security information, such as a CUG IC. The anticipated security information is security information that corresponds to embedded security information that the terminating MSS 24 expects to see in a setup message before allowing a connection to be established. The anticipated security information may correspond to the embedded security information in any of a number of ways, such as a security encode/decode and authentication. When the originating MSS 18 wishes to set up a SPVC or a SVC, it includes in the setup message embedded security information. When the terminating MSS 24 receives the setup message, it extracts any embedded security information included in the setup message and compares it with the anticipated security information. If the embedded security information corresponds to the anticipated security information, the terminating MSS 24 establishes the Layer-3 connection.

Before establishment of a secure Layer-3 SPVC or SVC is attempted, the terminating MSS 24 is configured with anticipated security information. The anticipated security information is related in the configuration to a call setup scenario, as described in more detail below with reference to step 66 of FIG. 2 and step 96 of FIG. 3. For example, the security information may include a CUG IC. The terminating MSS 24 may also be configured by defining a set of IP interface subscribers. Each IP interface subscriber is assigned respective anticipated security information, corresponding to a call set up scenario as described in more detail below with reference to step 115 of FIG. 4 and step 136 of FIG. 5.

Figure 2:
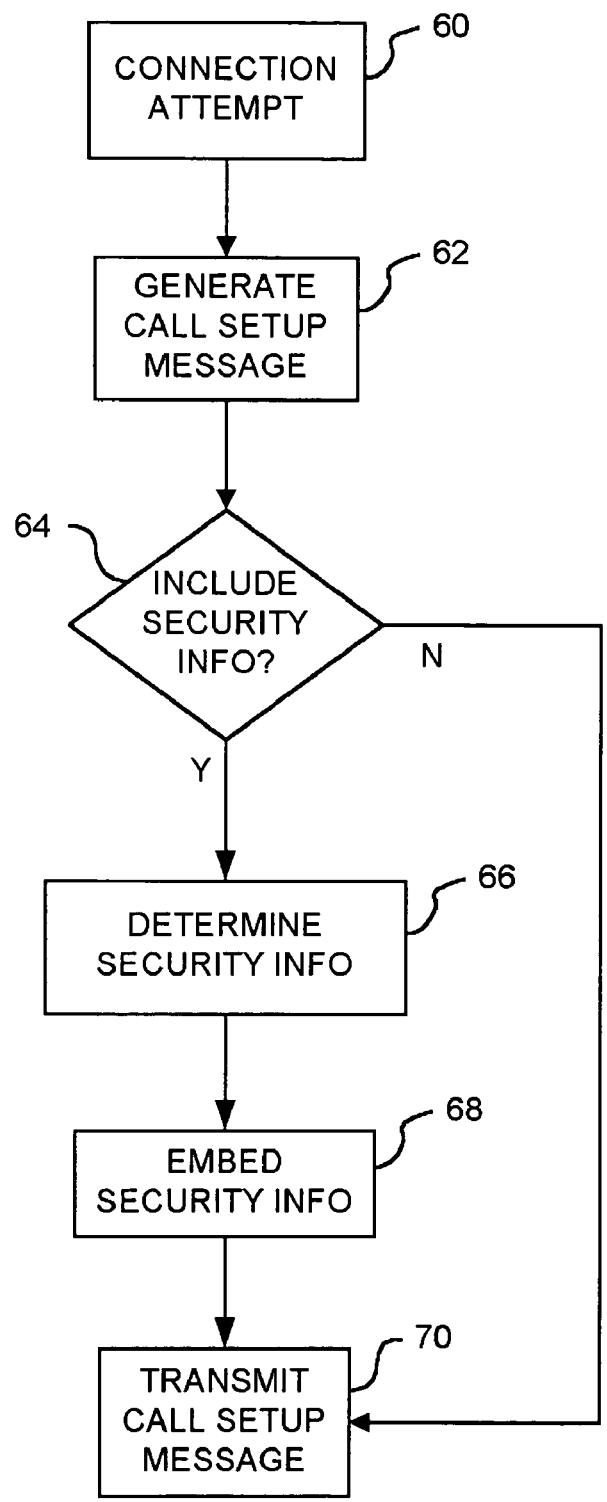
FIG. 2 is a flowchart of a method by which the originating multiservice switch (MSS) of FIG. 1 inserts security information into setup messages according to one embodiment of the invention.

Referring to FIG. 2, a flowchart of a method by which the originating MSS 18 inserts embedded security information into a setup message according to one embodiment of the invention is shown. The method is triggered by a Layer-3 SPVC connection attempt through the originating MSS 18 at step 60. At step 62 the call control within the originating MSS 18 generates a call setup message for establishing a Layer-3 SPVC to the terminating MSS 24. The call control determines at step 64 whether security information is to be embedded in the call setup message. This determination may be made in any of a number of ways, depending on configuration. Since the endpoint 14 at the originating MSS 18 is a fixed Layer-3 interface for a given SPVC, the call control may determine that all Layer-3 SPVC connections originating through a particular Layer-3 interface are to contain security information. Alternatively, the call control may determine that connections originating from one of a configured set of IP addresses are to contain security information. Generally, any test can be used to determine whether security information is to be embedded in the call setup message.

If the call control determines that security information is to be embedded in the call setup message, then at step 66 the call control determines the security information to be embedded. The security information to be embedded can be determined in any of a number of ways, as long as the terminating MSS 24 will be able to know what embedded security information it should be looking for. The security information to be embedded must therefore be associated with the connection at some level. As an example, any connection between one of a configured set of originating users and one of a configured set of destination users can be associated with particular security information. Other examples of associations between security information and a connection are: configured originating users on the originating MSS 18 attempting to access the terminating MSS 24; any connection between specified Layer-3 endpoints at the originating MSS 18 and specified Layer-3 endpoints at the terminating MSS 24; any connection originating at the originating MSS 18 and attempting to connect to configured destination users on the terminating MSS 24; specific services on the originating MSS 18 (such as video distribution, gaming, internet access); specific services being accessed on the terminating MSS 24; and connection within a CUG and/or correct security information.

Once the call control has determined what security information to embed within the call setup message, the call control embeds the security information within the call setup message at step 68. In one embodiment, the call control also sets a flag within the call setup message to indicate that the call setup message includes embedded security information (see below with reference to step 86 of FIG. 3). At step 70, the call control transmits the call setup message to the terminating MSS 24. The call control also transmits the call setup message to the terminating MSS 24 if it was determined at step 64 that no security information was to be embedded in the call setup message.

Figure 3:
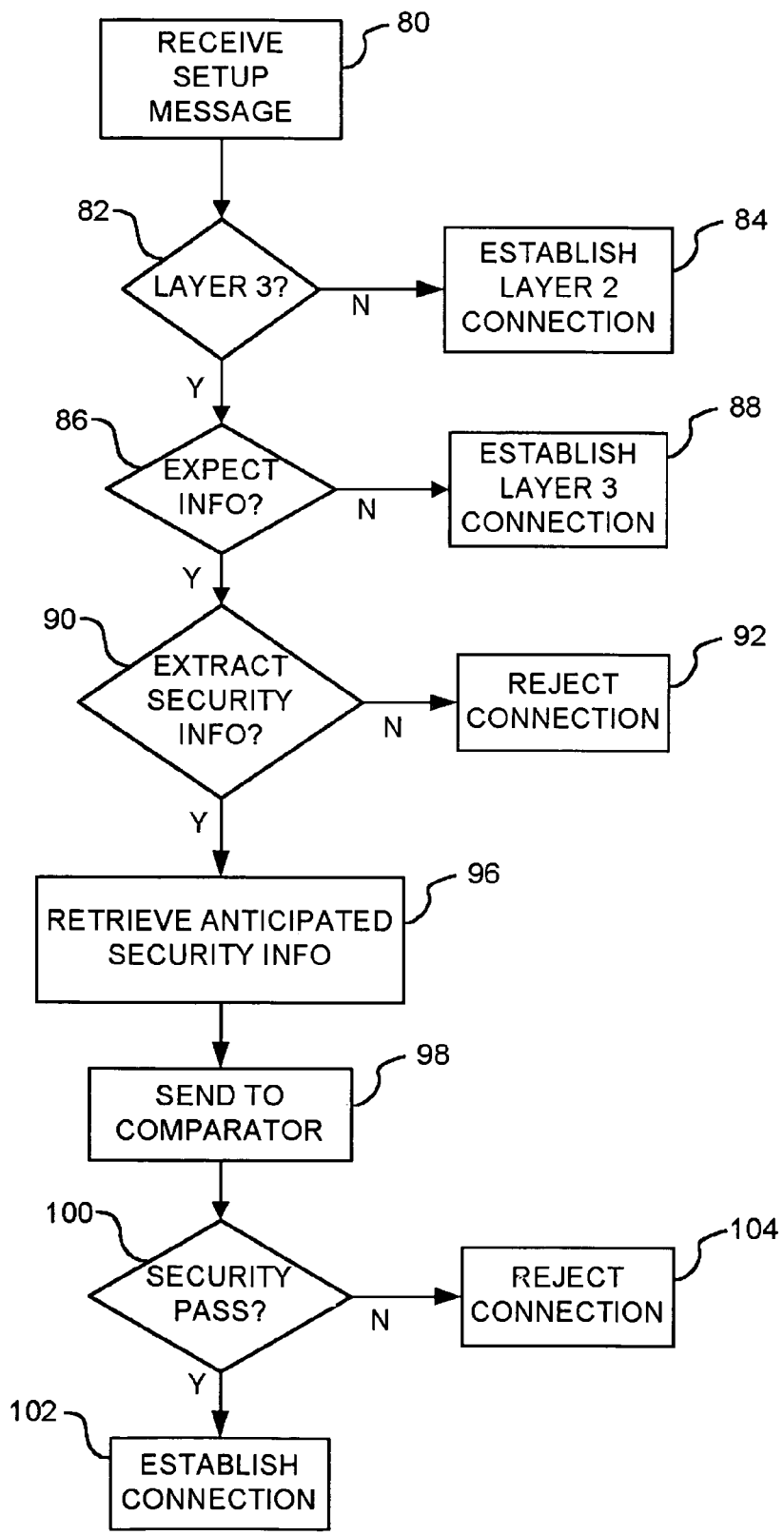
FIG. 3 is a flowchart of a method by which the terminating MSS of FIG. 1 verifies security information during call set up according to one embodiment of the invention.

Referring to FIG. 3, a flowchart of a method by which the terminating MSS 24 processes setup messages received from the originating MSS 18 during establishment of an SPVC according to one embodiment of the invention is shown. At step 80 the call controller within the terminating MSS 24 receives a setup message from the originating MSS 18. At step 82 the call controller determines whether the setup message corresponds to a Layer-3 connection by examining information elements within the setup message. If the setup message does not correspond to a Layer-3 connection, then at step 84 the call controller establishes a Layer-2 connection using conventional means.

If at step 82 the setup message corresponds to a Layer-3 connection, then at step 86 the call controller determines whether it is expecting security information to be embedded in the setup message. The call controller determines this in the same way as the call control within the originating MSS 18 determines whether security information is to be embedded in the call setup message, as described above with reference to step 64 of FIG. 2. Alternatively, if the call control of the originating MSS 18 sets a flag within the call setup message to indicate that the call setup message includes embedded security information, then the call controller within the terminating MSS 24 need simply determine the value of the flag. If the call controller determines that it is not expecting any embedded security information, then the call controller accepts the connection at step 88 by allocating a connection for the Layer-3 SPVC and sending a connect message to the originating MSS 18.

If the call controller determines at step 86 that it is expecting embedded security information, then at step 90 the call controller attempts to extract embedded security information, such as a CUG IC, from within the setup message. If there is no security information within the setup message, then the call controller rejects the connection at step 92. If call controller is able to extract embedded security information from the setup message, then at step 96 the call controller determines which anticipated security information relates to the setup message and retrieves the anticipated security information. The call controller determines which anticipated security information to expect based on the call scenario, using the same associations between call scenario and security information as is used by the call control within the originating MSS 18, described above with reference to step 66 of FIG. 2. For example, the call controller can determine the anticipated security information from membership of the calling user and the destination user in configured sets of users.

At step 98 the call controller sends the embedded security information and the anticipated security information to the comparator. The comparator compares the two sets of security information, and returns a comparison result to the call controller. If at step 100 the comparison result indicates that the embedded security information corresponds to the anticipated security information, the call controller accepts the connection at step 102 by allocating a connection for the Layer-3 SPVC and sending a connect message to the originating MSS 18. Otherwise, the call controller rejects the connection at step 104.

Figure 4:
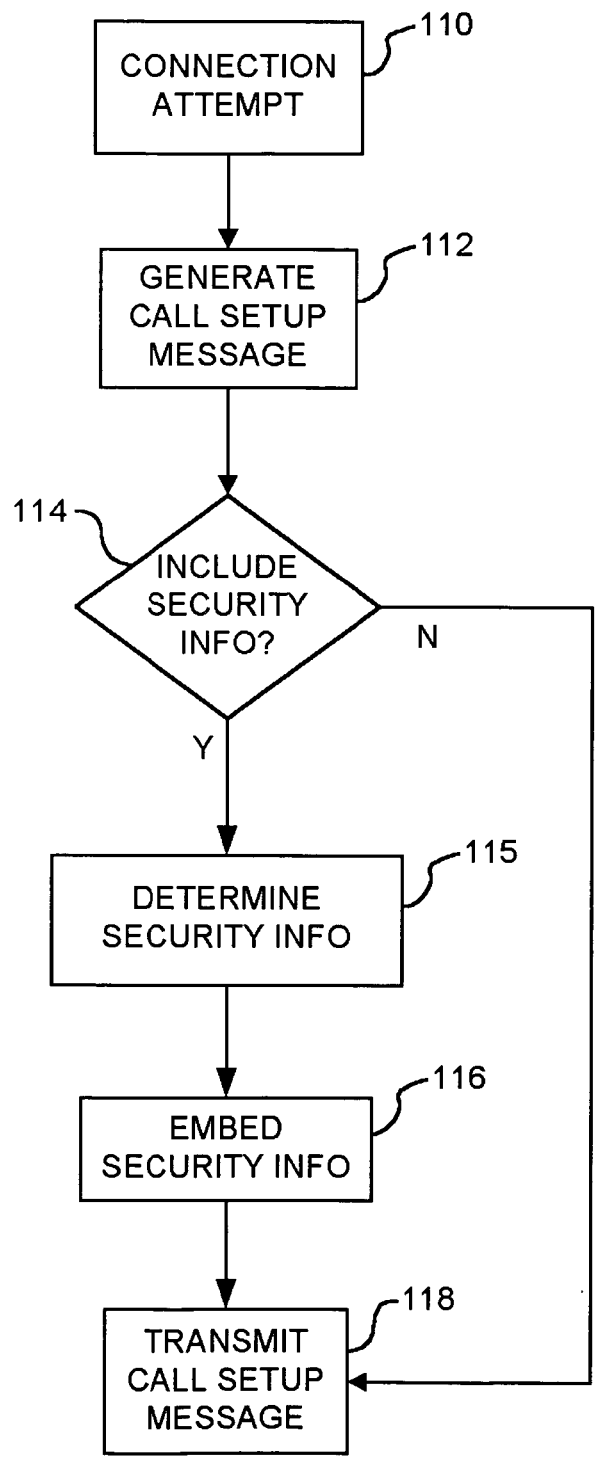
FIG. 4 is a flowchart of a method by which the originating MSS of FIG. 1 inserts security information into setup messages according to another embodiment of the invention.

Referring to FIG. 4, a flowchart of a method by which the originating MSS 18 inserts embedded security information into a setup message according to another embodiment of the invention is shown. The method is triggered by a Layer-3 SVC attempt through the originating MSS 18 at step 110. At step 112 the call control within the originating MSS 18 generates a call setup message for establishing a Layer-3 SVC to the terminating MSS 24. The call control determines at step 114 whether security information is to be embedded in the call setup message. This determination may be made in any of a number of ways, depending on configuration. The call control may determine that connections originating from one of a configured set of IP addresses are to contain security information. Alternatively, the call control may also determine that only connections that will terminate at one of a configured set of IP addresses are to contain security information. Generally, any test can be used to determine whether security information is to be embedded in the call setup message.

If the call control determines that security information is to be embedded in the call setup message, then at step 115 the call control determines the security information to be embedded. As an example, any connection between one of a configured set of originating users and one of a configured set of destination users can be associated with particular security information. Other examples of associations between security information and a connection are: configured originating users on the originating MSS 18 attempting to access the terminating MSS 24; any connection originating at the originating MSS 18 and attempting to connect to configured destination users on the terminating MSS 24; any connection established through one of a set of configured IP interface addresses at the originating MSS; any connection established through one of a set of configured IP interface addresses at the terminating MSS; specific services on the originating MSS 18 (such as video distribution, gaming, internet access); specific services being accessed on the terminating MSS 24; and connection within a CUG. The security information to be embedded can be determined in any of a number of ways, as described above with reference to step 66 of FIG. 2, as long as the terminating MSS 24 will be able to know what embedded security information it should be looking for.

Once the call control has determined what security information to embed within the call setup message, the call control embeds the security information within the call setup message at step 116. In one embodiment, the call control also sets a flag within the call setup message to indicate that the call setup message includes embedded security information. At step 118, the call control transmits the call setup message to the terminating MSS 24. The call control also transmits the call setup message to the terminating MSS 24 if it was determined at step 114 that no security information was to be embedded in the call setup message.

Figure 5:
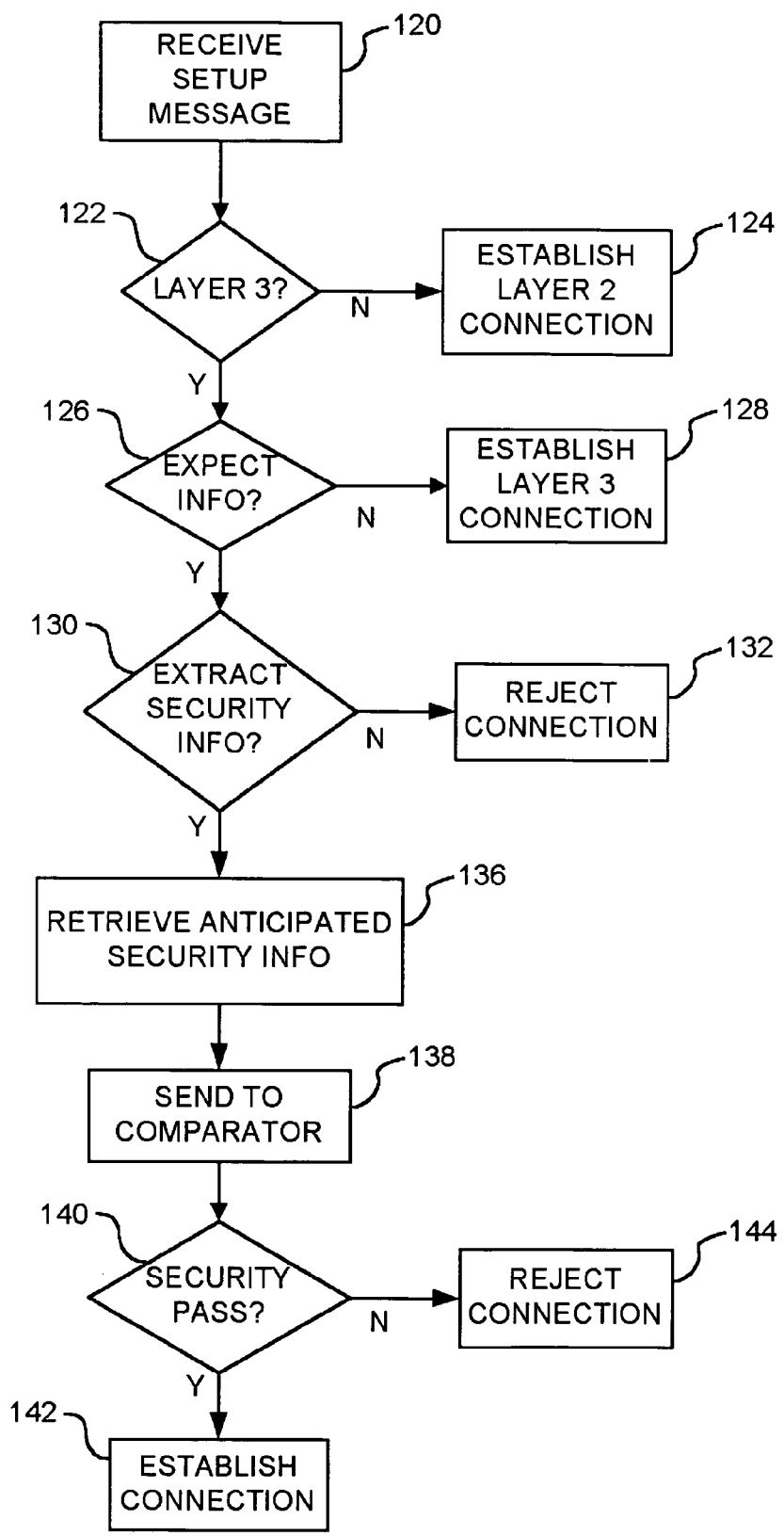
FIG. 5 is a flowchart of a method by which the terminating MSS of FIG. 1 verifies security information during call set up according to another embodiment of the invention.

Referring to FIG. 5, a flowchart of a method by which the terminating MSS 24 processes setup messages received from the originating MSS 18 during establishment of a Layer-3 SVC according to one embodiment of the invention is shown. At step 120 the call controller within the terminating MSS 24 receives a setup message from the originating MSS 18. At step 122 the call controller determines whether the setup message corresponds to a Layer-3 connection by examining information elements within the setup message. If the setup message does not correspond to a Layer-3 connection, then at step 124 the call controller establishes a Layer-2 connection using conventional means.

If at step 122 the setup message corresponds to a Layer-3 connection, then at step 126 the call controller determines whether it is expecting security information to be embedded in the setup message. The call controller determines this in the same way as the call control within the originating MSS 18 determines whether security information is to be embedded in the call setup message, as described above with reference to step 114 of FIG. 4. Alternatively, if the call control of the originating MSS 18 sets a flag within the call setup message to indicate that the call setup message includes embedded security information, then the call controller within the terminating MSS 24 need simply determine the value of the flag. If the call controller determines that it is not expecting any embedded security information, then the call controller accepts the connection at step 128 by allocating a connection for the Layer-3 SVC and sending a connect message to the originating MSS 18.

If the call controller determines at step 126 that it is expecting embedded security information, then at step 130 the call controller attempts to extract embedded security information, such as a CUG IC, from within the setup message. If there is no security information within the setup message, then the call controller rejects the connection at step 132. If the call controller is able to extract embedded security information, then at step 136 the call controller determines which anticipated security information relates to the setup message, and retrieves the anticipated security information. The call controller determines which anticipated security information to expect based on the call scenario, using the same associations between call scenario and security information as is used by the call control within the originating MSS 18, described above with reference to step 115 of FIG. 4. For example, the call controller can determine the anticipated security information from membership of the calling user and the destination user in configured sets of users.

At step 138 the call controller sends the embedded security information and the anticipated security information to the comparator. The comparator compares the two sets of security information, and returns a comparison result to the call controller. If at step 140 the comparison result indicates that the embedded security information corresponds to the anticipated security information, the call controller accepts the connection at step 142 by allocating a connection and an IP interface to the SVC and sending a connect message to the originating MSS 18. Otherwise, the call controller rejects the connection at step 144.

In one embodiment, the methods described above with reference to FIG. 3 and FIG. 5 are combined into a single method, executed by a single set of instructions. Following the step of receiving call setup signaling, the call controller determines whether the setup message is requesting a Layer-3 SPVC or a Layer-3 SVC. If the setup message is requesting a Layer-3 SPVC, then the call controller carries out the method described above with reference to steps 80 to 104 of FIG. 3. If the setup message is requesting a Layer-3 SVC, then the call controller carries out the method described above with reference to steps 120 to 144 of FIG. 5. The methods described above with reference to FIG. 2 and FIG. 4 can be combined in a similar manner.

The invention has been described using Closed User Group Interlock Codes as an example of the security information used to verify whether a Layer-3 connection can be established. Other forms of security information can be used, as long as a correlation between the security information and the desired connection can be stored as anticipated security information. As examples, public/private key protection schemes or encryption/decryption keys may be used.

The embodiments presented are exemplary only and persons skilled in the art would appreciate that variations to the embodiments described above may be made without departing from the spirit of the invention. Methods that are logically equivalent or similar to the methods described above with reference to FIG. 2, FIG. 3, FIG. 4, and FIG. 5 may be used to implement the methods of the invention. The scope of the invention is solely defined by the appended claims.

I claim:

1. A method of establishing a secure Layer-3 connection across an ATM network, the Layer-3 connection having a first endpoint at an egress port of an originating multiservice switch (MSS) and a second endpoint at an ingress port of a terminating MSS, the method comprising the steps of:

configuring the terminating MSS with anticipated security information;

at the originating MSS, generating a setup message including embedded security information;

sending the setup message to the terminating MSS;

at the terminating MSS, extracting the embedded security information from the setup message;

determining whether the embedded security information matches the anticipated security information; and if the embedded security information matches the anticipated security information, establishing the Layer-3 connection;

wherein the embedded security information and the anticipated security information are Closed User Group Interlock Codes.

\* \* \* \* \*